United States Patent [19]

Takeuchi et al.

[11] Patent Number: 4,899,073

[45] Date of Patent: Feb. 6, 1990

[54] 3-POSITION ROTATIONAL ACTUATOR

[75] Inventors: Muneo Takeuchi, Handa; Hiroji Kinbara, Okazaki; Masafumi Tsuruta, Oobu, all of Japan

[73] Assignee: Nippondenso Co., Ltd., Kariya, Japan

[21] Appl. No.: 224,117

[22] Filed: Jul. 25, 1988

[30] Foreign Application Priority Data

| | | | |
|---|---|---|---|
| Jul. 24, 1987 | [JP] | Japan | 62-186450 |
| Jul. 24, 1987 | [JP] | Japan | 62-186451 |
| Apr. 22, 1988 | [JP] | Japan | 63-100867 |

[51] Int. Cl.[4] ........................ H02K 7/00; H02K 33/12

[52] U.S. Cl. ........................ 310/116; 310/36; 310/43; 335/272

[58] Field of Search ........................ 310/33, 35, 36, 39, 310/75 D, 77, 40 R, 116, 117; 333/106, 105; 335/4, 5, 193, 272, 277

[56] References Cited

U.S. PATENT DOCUMENTS

| | | | |
|---|---|---|---|
| 3,644,763 | 2/1972 | Skrobisch | 310/36 |
| 3,959,672 | 5/1976 | Walker et al. | 335/272 |
| 4,609,841 | 9/1986 | Masaki et al. | 310/75 R |

*Primary Examiner*—Patrick R. Salce
*Assistant Examiner*—D. L. Rebsch
*Attorney, Agent, or Firm*—Cushman, Darby & Cushman

[57] ABSTRACT

The present invention relates to a 3-position rotational actuator which obtains three stable points by two pairs of field poles, in which the magnetic flux to a rotor due to one pair of field poles of a stator for maintaining the rotor at the first stable point is substantially equal to the magnetic flux to the rotor due to the other pair of field poles of the stator for rotating the rotor from the first stable point. The magnetic flux density of the other pair of field poles of the stator applied to the rotor is set to be smaller than the magnetic flux density of the one pair of field poles of the stator. Therefore, the detention torque can be maintained to the same degree and the drive torque can be improved.

8 Claims, 10 Drawing Sheets

3-POSITION ROTATIONAL ACTUATOR

BACKGROUND OF THE INVENTION

1. Industrial Application Field

The present invention relates to a 3-position rotational actuator capable of controlling three positions, i.e., one stable position of a rotor due to a field produced by one pair of four poles of a field pole and two stable positions given by stopping rotation immediately before the stable points due to positive and negative fields produced by another pair of the four poles thereof.

2. Prior Technique

Conventionally, a device for digitally controlling the rotational position is generally known as a stepping motor which is actually used in various applications. However, although being a simple system for attaining three positions, the stepping motor is required to have 6-pole field windings, thereby resulting in being unsuitable for use in areas requiring size-reduction and weight-reduction.

Thus, a 3-position rotational actuator has been proposed to allow control of three positions by use of only a 4-pole field pole. FIG. 8 is a schematic illustration for describing the operation principal of the 3-position rotational actuator. In FIG. 8, in response to operation of a switch S1, one pair of poles ϕA and ϕB of four field poles are spaced so as to oppose each other, and are excited to be of opposite polarities. In this state, a rotor R made up of a cylindrical permanent magnet is stable with its magnetic axis being coincident with the line of magnetic flux developed by the field poles ϕ1A and ϕ1B. After release of the switch S1, since rotor R is made of a permanent magnet, the rotor R is kept stable due to generation of a detention torque (position B in the Figure).

In response to operation of a switch S2, another pair of poles ϕ2A and ϕ2B are excited (direction of the field at this time is positive) and the rotor R receives a rotational force tending to rotate it counterclockwise from the stable position indicated by B until the magnetic axis of the rotor R is coincident with the line of magnetic flux developed by the poles ϕ2A and ϕ2B. However, a rotation-limiting member is provided with respect to the rotor R so as not to cause the magnetic axis to be coincident with the line of magnetic flux due to the counterclockwise rotation of rotor R, whereby the rotor R stops when the magnetic axis is rotated to a position indicated by A in the Figure. Similarly, in response to turning on a switch S3, although receiving a clockwise rotational force, the rotor R stops due to a rotation limiting member after rotated up to a position indicated by C in the Figure.

Irrespective of such a simple structure, a 3- position rotational actuator can be realized which is controllable to take the three positions (stable points) indicated by A, B, C. Because it is small in size and light in weight, it has been used as an actuator of motor vehicles, for example.

Problems to be Resolved by the Invention

However, such a 3-position rotational actuator is unsatisfactory, and has the following problems.

Characteristics necessary for stepwise position control, not limited to a 3-position rotational actuator, are that the holding torque at the stable point is great and the drive torque is great on shifting from one stable point to another stable point. Even in the case of the conventional 3-position rotational actuator, although it is possible to increase the magnetic force of the permanent magnet of the rotor R and further increase the holding torque (detention torque) and drive torque by enlarging the size of the field pole, this results in new problems such as of the apparatus which limits the application and increases the cost. For resolving these problems, the present inventors have made the following experiment for improving the state of the magnetic flux by varying the sizes of the magnetic pole pieces of the field pole. FIG. 9 are descriptive diagrams showing the relationship between the sizes of the magnetic poles of the field pole of a 3-position rotational actuator and the detention torque, or the drive torque. As shown in FIG. 9A, the size of each member of one pair of magnetic pole pieces can be expressed by an angle (which will be referred to as core stator angle) ϕA of the rotor R with respect to the center of rotation. FIG. 9B depicts characteristic curves showing the variation of the B-position detention torque in accordance with variation of the core stator angle θA and the variation of the drive torque on shifting from position B to position A or C. Here, the size of each of the other pair of magnetic pole pieces is kept constant ($\theta B=78°$). As obvious from FIG. 9*b*, when the core stator angle θA is small, the detention torque becomes great and the drive torque becomes small, and on the other hand, when when the core stator angle θA is great, the drive torque becomes great and the detention torque becomes small. This may result from that fact that, when the core stator angle θA is small, the magnetic flux is concentrated at the center of the field pole, the magnetic flux from the rotor R for generating the detent torque with respect to the rotor R is centered at the centers of field poles ϕ1A and ϕ1B so as to heighten the magnetic flux density, and the pole-spacing distance between the magnetic poles due to the field poles ϕ2A and ϕ2B for driving the rotor R becomes great. If the core stator angle θA is made great, since the magnetic flux of the rotor R passes through the wide field poles ϕ1A and ϕ1B, the dentention torque is decreased in proportion with decrease in the magnetic flux density and the drive torque becomes great because the magnetic poles of the field poles ϕ2A and ϕ2B are close to the magnetic poles of the rotor R. Due to such characteristics, on using the 3-position rotational actuator, determination is made in terms of making greater account of either the detention torque or the drive torque so as to design an apparatus with an optimal core stator angle θA.

However, for obtaining the most preferred 3-position rotational actuator generation of a detention torque and drive torque sufficiently suitable for various applications is required without resulting in an increase in size, weight or cost of the actuator due to use of a high magnetic force permanent magnet for the rotor, increase in the turning number of the field pole, and so on.

The first object of the present invention is to provide a 3-position rotational actuator which is excellent in both the detention torque and the drive torque irrespective of size and weight by bringing out the maximum of action of the rotor and field pole with a magnetic force and a turning number equal to those of conventional actuators.

Furthermore, the 3-position rotational actuator is constructed as follows for simpler manufacturing.

First, a 4-pole, field pole is covered by a bowl-like yoke so as to arrange a field circuit and a rotor, having an output shaft at its center position, to be rotatably supported at a center portion of the field pole. With such an arrangement of an electric section, in order to enclose the field pole and rotor, a base member having at its center portion a through-hole for penetration of the output shaft is attached the yoke to making up the 3-position rotational actuator. In addition, rotation limiting members are arranged respectively by respectively providing projections on the base member and the rotor so that the rotation of the rotor is stopped by coming into contact therewith.

However, such an arrangement causes the base member to become complex in configuration. It is necessary to provide the projections being the rotation limiting members for limiting the rotation of the rotor, to form at the center portion the through-hole for penetrating the output shaft, and to perform some machining for heightening the positioning accuracy thereof with respect to the yoke and further to have, for example, connectors for introducing lead wires to supply field current to the field pole encased therein. In order to obtain such a complex configuration, to reduce impact noises generated when the projections provided on the rotor and the base members as the rotation limiting members come into contact with each other, and to reduce the magnetic influence to a driven body as much as possible on installation of the 3-position rotational actuator, it is preferred to form the base member using a resin.

The mechanical strength of the formed resin is lower compared with that of the other pieces such as the yoke which make up the 3-position rotational actuator, and therefore the following arrangement is made when the 3-position rotational actuator is attached to a driven body. FIG. 10 is a perspective drawing showing how a bracket C of a driven body is attached to end portions of the longer axial directions of a substantially elliptical 3-position rotational actuator by means of two bolts BA, BB, FIG. 10A is a perspective view of the external appearance thereof and FIG. 10B is an enlarged cross-sectional view taken along a line I—I. As shown in the Figures, a flange Yb is formed at an open portion of yoke Ya formed by the press-machining of an iron plate. The flange Yb is integrally secured to the upper surface of a resin-made base member B by means of a number of rivets R. When the 3-position rotational actuator is attached to the bracket C of the drive body, the base member and the bracket C are fixedly secured to each other by means of the bolts BA, BB. A compressing force e to the bolts BA, BB is then applied to the base member B and therefore iron-made collars D are inserted under pressure into the insertion holes of the bolts BA, BB or integrally formed therewith in order to prevent the base member B from being broken.

Thus, although the 3-position rotational actuator itself is simple in structure and can be manufactured at a low cost, parts are required to increase the mechanical intensity of the accompanying portion to be attached to the driven body, resulting in increase in the number of the manufacturing steps and in cost.

Therefore, the second object of the present invention is to provide an excellent 3-position rotational actuator capable of simplfying the arrangement including the accompanying portion and being easily manufactured at a lower cost.

Furthermore, in a 3-position rotational actuator adapted to obtain three stable points with four poles, the rotation of the rotor R is compulsorily stopped by the rotation limiting portion to obtain two stable positions (positions A and C in FIG. 9). That is, whenever the 3-position rotational actuator is controlled to take the two positions, first and second limiting members of the rotation limiting portion are collided with each other. This causes problems such as impact noises due to collision of both the limiting members and mechanical deterioration of both the limiting members.

One possible countermeasure to remove these problems is that the rotational force of the rotor R is lowered to decrease the impact force between both the limiting members. However, most of objects using the 3-position rotational actuator require a great drive torque and a high responsiveness, and therefore this countermeasure is not useful in practice.

In addition, as a countermeasure to resolve the above-mentioned problems without lowering the drive torque and the responsiveness of the 3-position rotational actuator, there is a method in which the first and second limiting members are formed with a sufficiently elastic material. However, this method causes both the limiting members to be greatly bent due to their elastic characteristics when coming into contact with each other and therefore difficulty is encountered to accurately determine the the two stable positions of the rotor R, resulting in the lack of the basic performance necessary for the 3-position rotational actuator.

Therefore, the third object of the present invention is to provide a 3-position rotational actuator which has a great drive torque and a high responsiveness, allows accurate determination of the respective stable positions, has little operation noises and is excellent in durability.

DETAILED DESCRIPTION OF THE INVENTION

A more detailed description of the present invention will be made hereinbelow in accordance with Figures.

Figure 1:
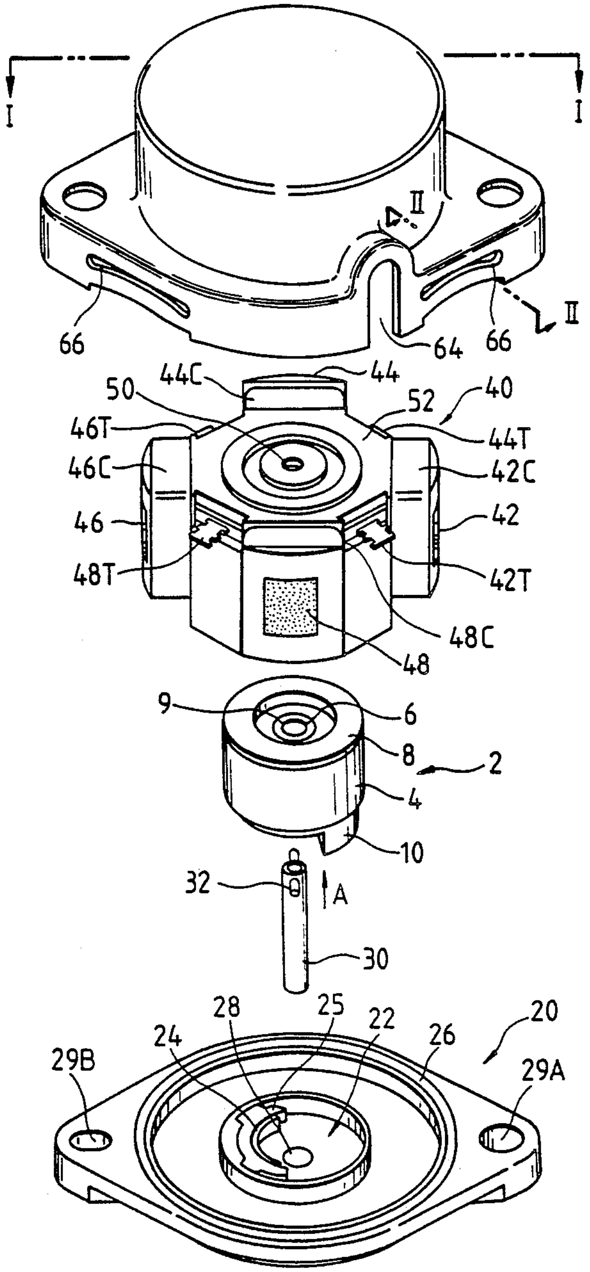
FIG. 1 is an exploded perspective view showing a 3-position rotational actuator according to an embodiment.
Figure 2:
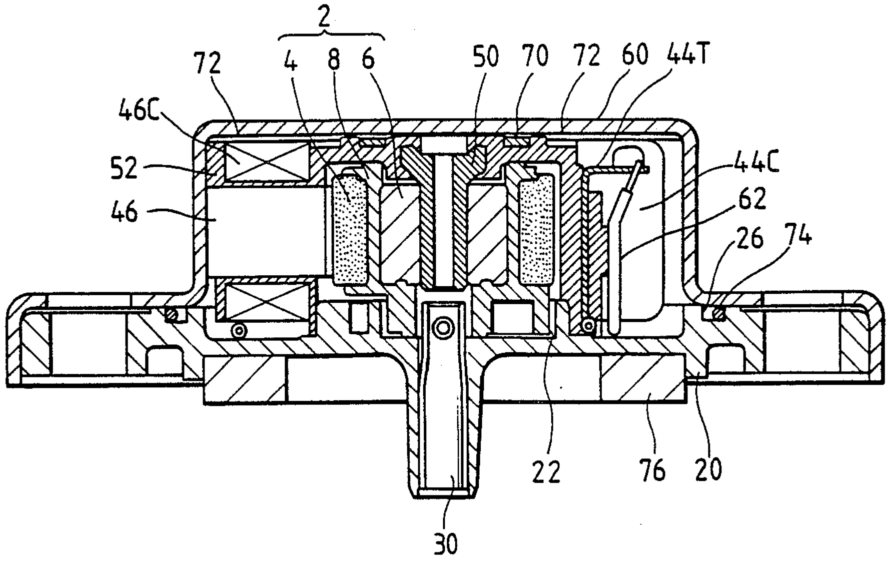
FIG. 2 is a cross-sectional view of the FIG. 1 actuator taken along a line I—I.
Figure 3:
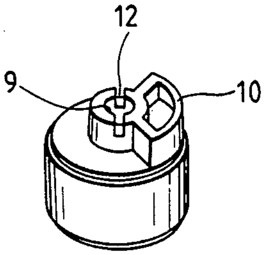
FIG. 3 shows a rotor of the FIG. 1 actuator viewed from direction A.

FIG. 1 is an exploded perspective view of a 3-position rotational actuator according to this embodiment, FIG. 2 is a cross-sectional view thereof taken along a line I—I, and FIG. 3 is an illustration of a rotor thereof viewed from the direction of an arrow A.

The rotor 2 of the 3-position rotational actuator comprises a cylindrical permanent magnet 4 formed by a rare earth material or a ferrite and magnetize to have two poles, a cylindrical ring 6 formed with iron-system sintering and a resin-made bobbin 8. The rotor 2 is arranged to have at its outer circumference the permanent magnet 4 and at its inner circumference the ring 6 which are integrally formed by means of the bobbin 8. Therefore, the rotor 2 is a cylindrical member made such that its inner diameter corresponds to the inner diameter of the ring 6 and its outer diameter corresponds to the outer diameter of the permanent magnet 4. The rotor 2 has a shaft-insertion hole 9 formed at the center portion thereof and whose diameter is equal to the inner diameter of the ring 6. The permanent magnet 4 is not limited to the cylindrical configuration but may be of a segment type. Furthermore, on the lower surface of the bobbin 8, a slit portion 12 and a stopper portion 10 are formed for limiting the rotational angle of the rotor 2. The rotor 2 is inserted into a rotor loosely-fitting portion 22 formed on a base member 20 and the stopper portion 10 comes into contact with a stopper portion 24 formed in the rotor loosely-fitting portion 22 in response to rotation of the rotor 2 so that the rotation of the rotor 2 is limited to a predetermined angular range. Furthermore, the slit portion 12, being formed in the peripheral wall of the shaft-insertion hole 9 positioned at the center portion of the lower surface of the plastic bobbin 8, is engaged with a pin 32 fitted under pressure at one end portion of a rotational shaft 30, i.e., the output shaft of the 3-position rotational actuator, so as to allow transmission of the rotational force, resulting in so-called universal coupling.

On the base member 20 are formed the rotor loosely-fitting portion 22, the stopper portion 24 for holding a cushion member 25 made of an elastic member such as rubber and further are integrally formed a circular channel 26 coaxial with the rotor loosely-fitting portion 22 and a through-hole 28 which is made at the center portion of the rotor loosely-fitting portion 22 to penetrate the rotational shaft 30. The whole base member 20 has an elliptic configuration and bolt-holes 29A and 29B are formed at portions in the vicinity of the outer circumference and in the longest diameter directions so as to allow penetration of bolts for attaching the assembled 3-position rotational actuator to a driven member.

The bolt-hole 29A is formed to have a hole whose diameter is slightly larger than the diameter of the bolt, whereas the bolt-hole 29B is formed to be an elongated hole for the purpose of improving the position accuracy on assembling. Therefore, since the positioning for the opposite side is made by the engagement of the protruding portion of the base member 20 and the elongated bolt-hole 29B, the positioning accuracy can be improved on assembling. Due to the requirement of such a complex configuration, the base member 20 is made of a resin so as to integrally construct the respective part thereof.

A stator 40 has four cores 42, 44, 46 and 48 positioned to be normal to each other, and further at its center portion, shaft 50 which is integrally formed with a resin member 52, and on the outer circumference of the resin member 52 covering the cores 42 to 48 are provided coils 42C to 48C, the winding end portions of which are twisted around terminals 42T to 48T inserted under pressure into the resin member 52 and then soldered. The assembling is made by inserting the shaft 50 into the shaft-insertion hole 9 formed at the center of the rotor 2. On insertion, a design is made in advance such that a small gap is formed between the inner circumferential portions of the cores 42 to 48 and the outer circumferential portion of the rotor 2. In addition, in order to smooth the rotation of the rotor 2, the shaft 50 is constructed of an iron-system sintering metal impregnated with a lubricating oil.

Figure 4:
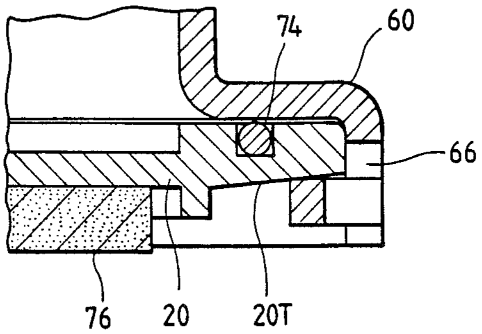
FIG. 4 is an enlarged cross-sectional view of the FIG. 1 actuator taken along a line II—II.

A yoke 60 is constructed of a pressed iron plate and has a lead introduction inlet 64 for a lead wire 62 to effect the electric connection between the end portions of the coils 42C to 48C attached to the terminals 42T to 48T and an external exciting source. The yoke further has a slit 66 for fixing and holding the base member 20. After assembling of the respective parts as shown in FIG. 2, a lower portion of the yoke 60 in which the slit 60 is formed is bent inside so that the yoke 60 and the base member 20 are integrally coupled to each other. FIG. 4 is an enlarged cross-sectional view of the coupling portion (II—II cross-sectional view) of the yoke 60 and the base member 20. As illustrated in the Figure, the base member 20 has at its circumferential surface bottom portion a tapered portion 26 whereby the tight assembling of the yoke 60 and the base member 20 can be achieved only by bending the yoke 60 under the slit 66 inside.

A wave washer 70 which acts to press the stator 40 toward the base member 20 is provided between the stator 40 and the yoke 60. An insulating plate 72 is provided between the the respective coils 42C to 48C of the stator 40 and the yoke 60 so as to insulate the terminals 42T to 48T from the yoke 60. Furthermore, in the circular channel 26 of the base member 20 is fitted an O-ring 74 which is interposed between the yoke 60 and the base member 20 on the assembling so as to appropriately keep the waterproofing of the 3-position rotational actuator.

Figure 11:
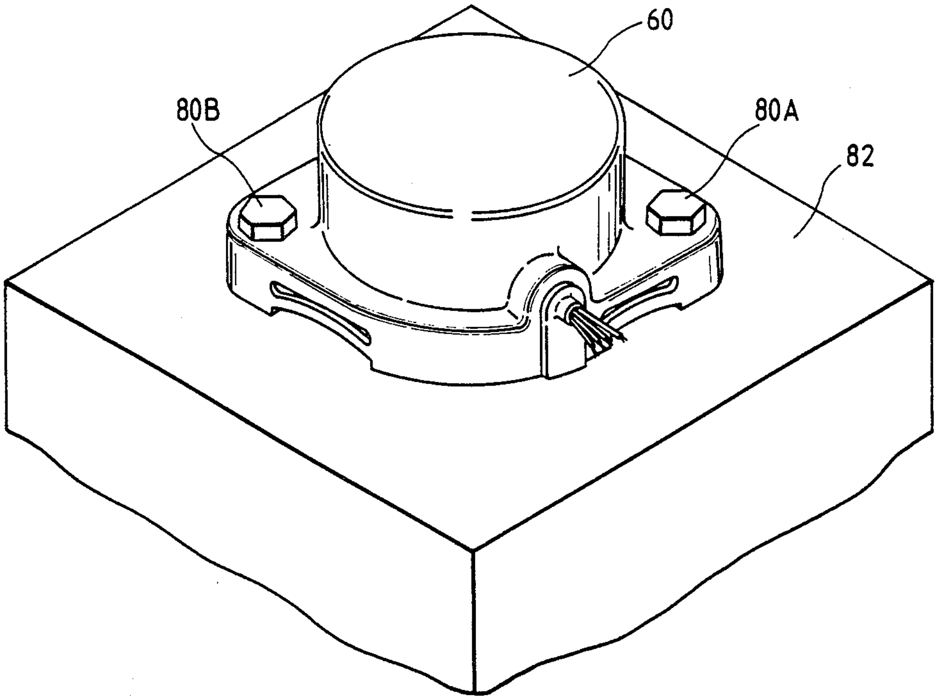
FIG. 11 is a perspective view showing the state that the assembled 3-position rotational actuator is attached to a driven body.

In the 3-position rotational actuator of the above-mentioned embodiment, the base member 20 is constructed of a resin-formed article capable of easily forming a complex configuration, thereby having as well a simple arrangement as well as in the conventional devices reducing the impact noises between the stopper portions 10, 24 and removing the magnetic influence to the drive body. Furthermore, the 3-position rotational actuator with the above-mentioned arrangement can provide the following specific effects, not achieved by conventional models, when used attached to a drive body. FIG. 11 is a perspective view showing the state that the 3-position rotational actuator, with the above-mentioned arrangement, is attached to a bracket 82 of the driven body by means of bolts 80A and 80B. As illustrated in the Figure, only the open portion of the yoke 60, being strong, is brought into contact with the bracket 82 of the driven body and the base member 20 is integrally coupled to the yoke 60, with a portion of the yoke 60 under the slit being bent inside as shown in FIG. 4, thereby not allowing contact with the bracket 82. In addition, a sponge rubber 76 stuck to the bottom surface of the base member 20 for waterproofing acts as a cushioning material to guard the base member 20.

Thus, on attaching the 3-position rotational acutator to the driven body, a guard member such as collar conventionally required to prevent a mechanical damage of the base member 20 can be removed completely, resulting in simplification of the assembling steps and decrease in the manufacturing cost. In addition, since the integration of the base member 20 and the yoke can be completed with only the slit formed in the yoke, the other fixing members are not required, so as to easily realize it at a low cost. The accuracy of the assembling thereof can be maintained high without being shaky in the coupling portion because of the tapered portion 20T formed at the bottom surface circumference of the base member 20.

Furthermore, since the 3-position rotational actuator according to this embodiment the shaft 50 for supporting the rotor 2 is planted in the stator 40, the rotor 2 being completely positioned at the center of the stator 40 by means of the shaft 50, the gap between the rotor 2 and the cores 42 to 48 can be designed to be slight. As a result, in addition to the size-reduction, the 3-position rotational actuator can generate a great magnetic flux to increase both the drive torque and detention torque. Furthermore, since the rotor iteself is constructed of a combination of the permanent magnet 4 and the magnetic ring 6, irrespective of use of the permanent magnet 4 which is small in size and light in weight, the entire rotor 2 shows an excellent magnetic characteristic due to the magnetic ring 6, improving the detent torque and drive torque.

A description will be made hereinbelow in terms of the electric structure of the above-mentioned 3-position rotational actuator with reference to a structure diagram of FIG. 5.

Figure 5:
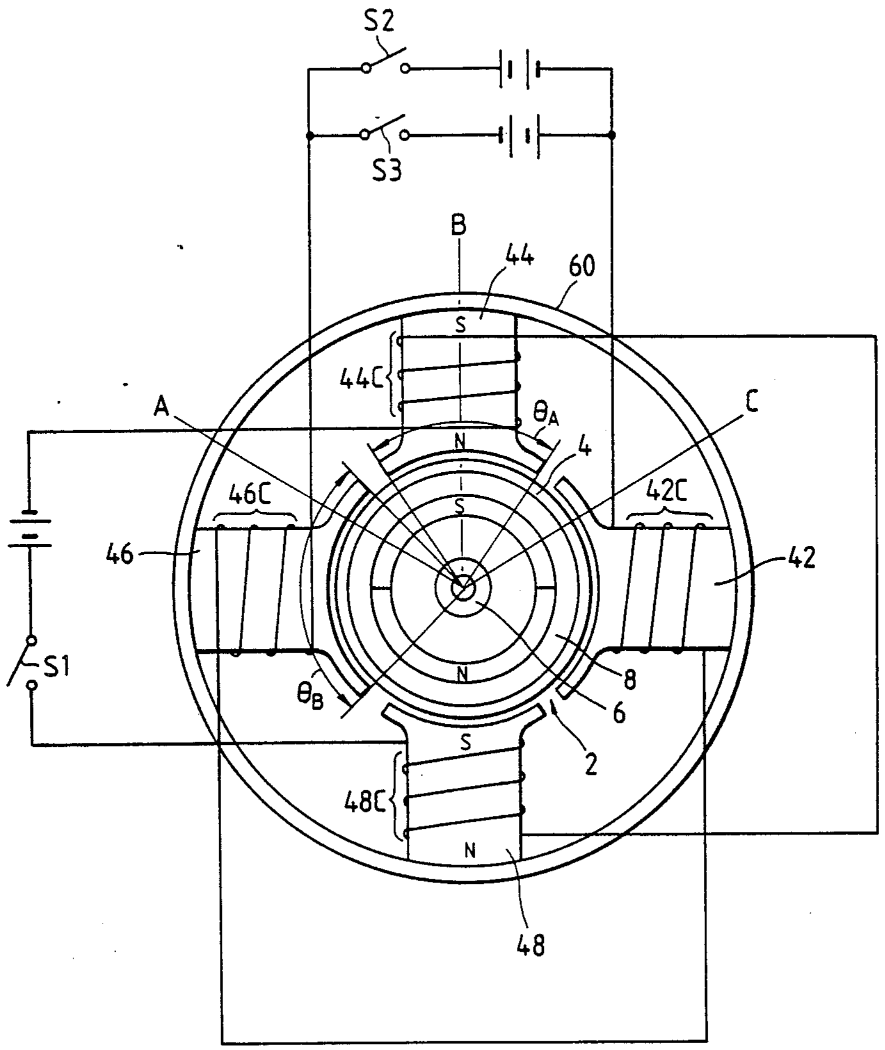
FIG. 5 is an illustration of an electric structure of the embodiment.
Figure 9A:
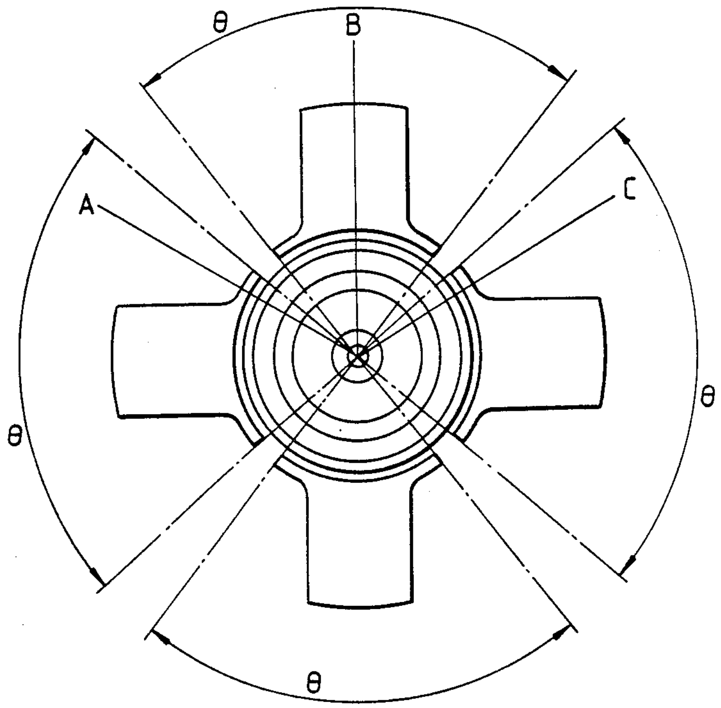
FIG. 9 are illustrations of the characteristics of the detention torque and the drive torque thereof.
Figure 9B:
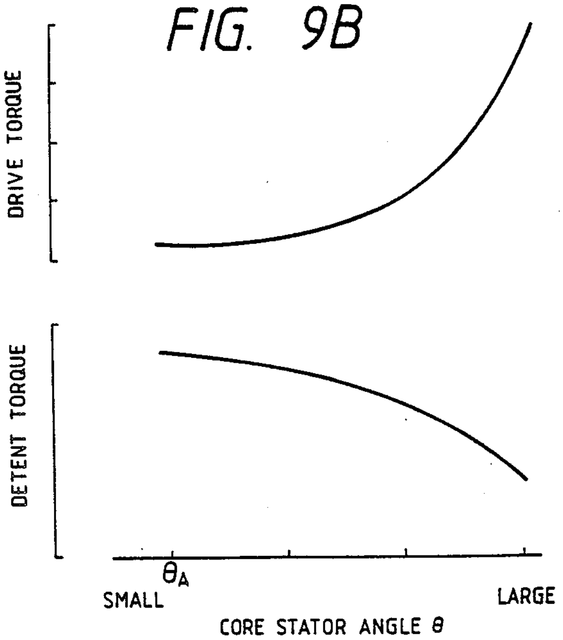
Figure 10A:
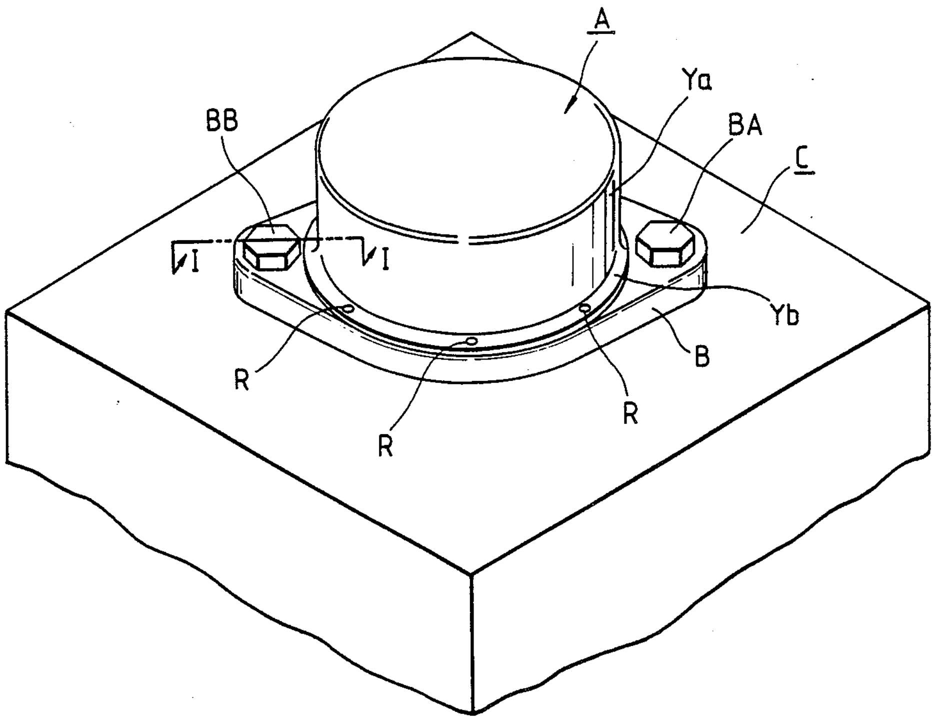
FIGS. 10A and 10B are illustrations for describing the installation state of the conventional 3-position rotational actuator.
Figure 10B:
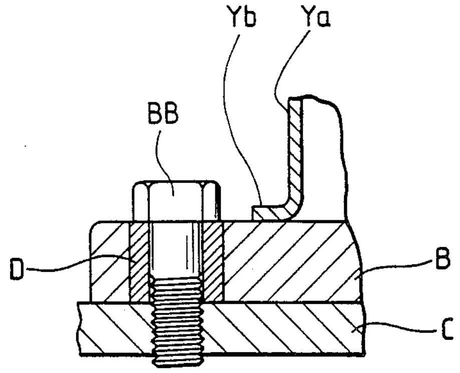

As shown in FIG. 5, the cores 42 to 48 of the 3-position rotational actuator of this embodiment comprise two different cores, that is, each of the cores 42 and 46 is arranged such that a portion facing the rotor 2, i.e., the magnetic pole piece is larger, whereas each of the cores 44 and 48 is arranged such that the magnetic pole piece is smaller. The core stator angle is $\theta$A in terms of the cores 44, 48 and $\theta$B ($>\theta$A) for the cores 42, 46. Here, the core stator angle $\theta$A is equal to the core stator angle in the description of the conventional technique (see FIG. 9) and set so that the detent torque at a position B becomes greater. Furthermore, the rotational range of the rotor 2 is from position A to position C, where the stoppers 10 and 24 come into contact with each other, the 3-positions of the positions A, B and C being stable points of the rotor 2.

Thus, in the 3-position rotational actuator of this embodiment, the core actuator angle $\theta$B is set to be greater than the core stator angle $\theta$A and therefore the detention torque and drive torque of the 3-position rotational actuator at the position B are varied as follows.

Figure 6:
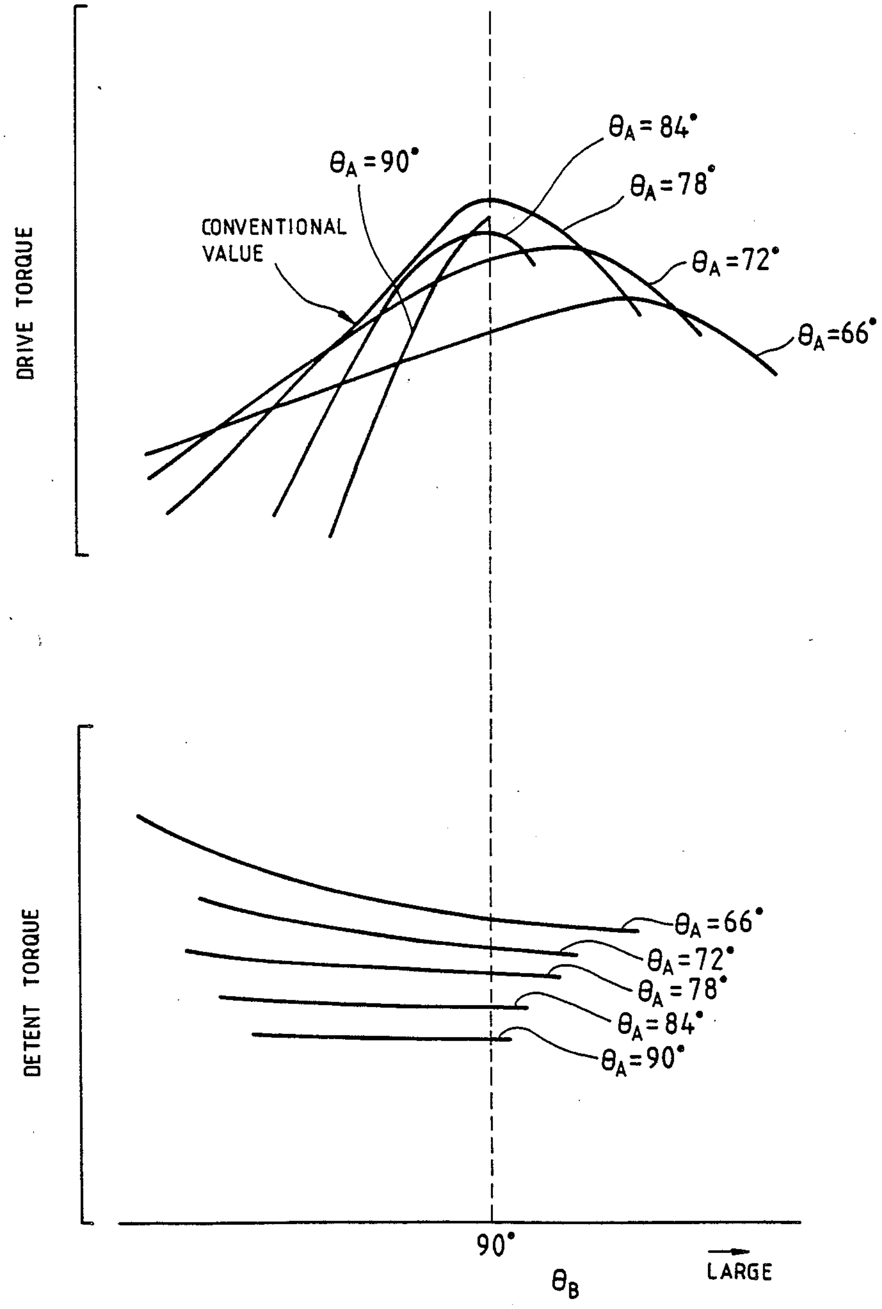
FIG. 6 are illustrations of the characteristics of the detention torque and the drive torque thereof.

FIG. 6 shows the characteristic of the detention torque at position B of the rotor 2, obtained when the core stator angle $\theta$A of the 3-position rotational actuator of this embodiment is fixed ($\theta$A=78°) and the core stator angle $\theta$B is variable and further the characteristic of the drive torque in the case that the rotor 2 is driven from the position B to the position A or C. Here, the ampere-turn is turning number (290T×2)×current 1.5 A=870AT. In response to increase in the core stator angle $\theta$B, the magnitude of the detention torque is determined by the cores 44 and 48 whose core stator angle $\theta$A substantially assumes a constant value and the drive torque is guradually increased and then decreased after reaching a peak ($\theta$B=90° in this embodiment). This drive torque characteristic is considered to result from the fact that the magnetic flux density applied from the cores 42, 46 to the rotor 2 becomes smaller as the core stator angle of the core 42, 46 becomes greater. The suction force of the rotor 2 from the position B to the position A or C becomes greater and the extreme increase of $\theta$B causes the cores 42, 46 and the cores 44, 48 to approach each other to decrease the great attraction force due to leakage between the cores. Therefore, in the 3-position rotational actuator of this embodiment, the core stator angle of the cores 42, 46 is set to an angle $\theta$B>78° ($\theta$B=90° in this embodiment) so as to allow making great both the detention torque and drive torque. When the core stator angles $\theta$A and $\theta$B are different, the detention torque at the stable point, i.e., positions A and C, becomes great because the magnetic flux generated from the permanent magnet 4 of the rotor 2 passes through the cores 42, 46 whose magnetic resistances have become small due to the larger magnetic pole pieces, and further the drive torque is kept to be substantially equal in magnitude to that of the conventional one.

Furthermore, according to an experiment, with respect to ($\theta$A, $\theta$B)=(78°, 78°), the stator angle $\theta$A of the cores 44 and 48 which is capable of improving the drive torque and maintaining the detention torque to over the same degree, as shown in FIG. 6, is substantially in a range of 65°<$\theta$A<80°, and the stator angle $\theta$B of the cores 42 and 46 for $\theta$A=66° is in a range of 95°≦$\theta$B≦106° and the stator angle $\theta$B corresponding to $\theta$A=72° is in a range of 81°≦$\theta$B≦106°. A combinations of the particularly preferred stator angle), other than the case (78°, 90°) in this embodiment, there are (72°, 96°), (66°, 102°) which have been confirmed by experiment.

According to the 3-position rotational actuator of this emboidment described above, with a simple reconstruction, i.e., only changing the core configuration, it is posible to easily obtain a 3-position rotational actuator which satisfies both the detention torque and drive torque having as great as possible values necessary as a product. Therefore, without using as the permanent magnet of the rotor 2 one which has a large magnetic force or which results in being large in size and costly, and further without increasing the size of the cores 42 to 48 or increasing the weight such as increases in the turning numbers of the coils 42C to 48C, it is possible to realize a 3-position rotational actuator with high detention torque and drive torque. This causes great improvement of the characteristic irrespective of the weight, size and cost being the same as the conventional one and allows applications to various fields.

Figure 7A:
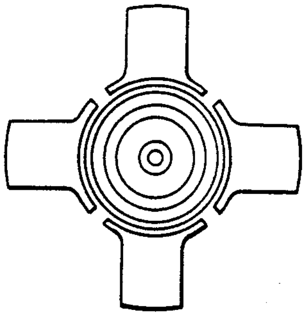
FIGS. 7A and 7B are illustrations for describing the configurations of cores in another embodiment.
Figure 7B:
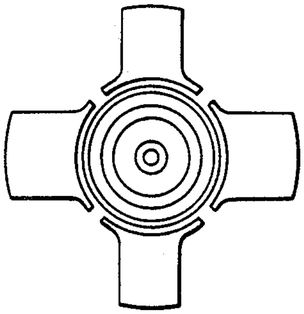
Figure 8:
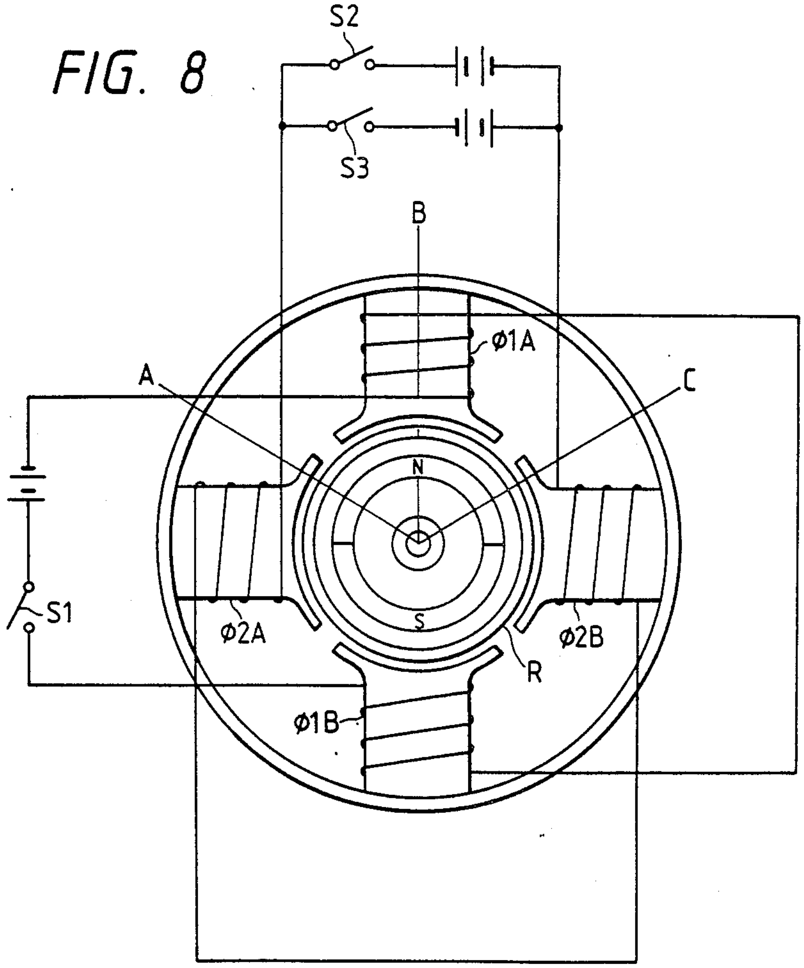
FIG. 8 is an illustration for describing the operation of a conventional 3-position rotational actuator.

Although in the above-mentioned embodiment the magnetic flux state of the 3-position rotational actuator improves when the shapes of the magnetic pole pieces of the cores 42 to 48 are reconstructed to have large or small sizes, the prevent invention is not limited to the above-mentioned embodiment and the same effect can be obtained if the magnetic flux of one pair of cores 44 and 48 is concentrated and the magnetic flux of another pair of cores 42 and 46 is decentralized up to the peripheral portions of the cores. Thus, it is also appropriate that, as shown in FIG. 7A, the magnetic pole pieces of one pair of cores are made thin so as to heighten the magnetic resistance at the peripheral portions and the magnetic pole pieces of another pair of cores are made thick so as to reduce the magnetic resistance at the peripheral portions. As shown in FIG. 7B, even in the case that the respective magnetic pole pieces have the same configuration, one pair of cores are made narrower and another pair of cores are made wider so as to have a similar magnetic resistance characteristic.

Figure 12:
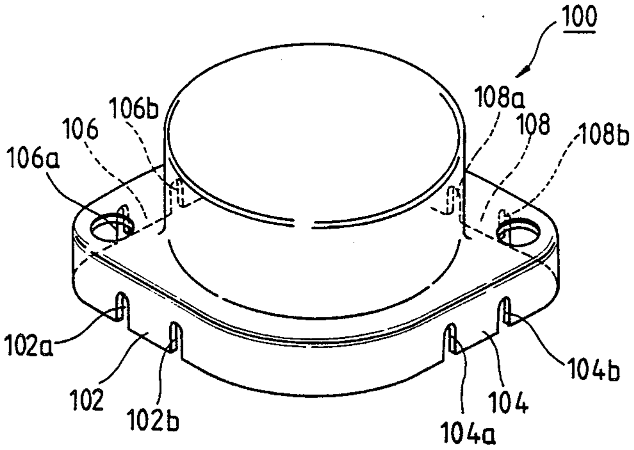
FIG. 12 is a perspective view showing a yoke in a further embodiment.
Figure 13A:
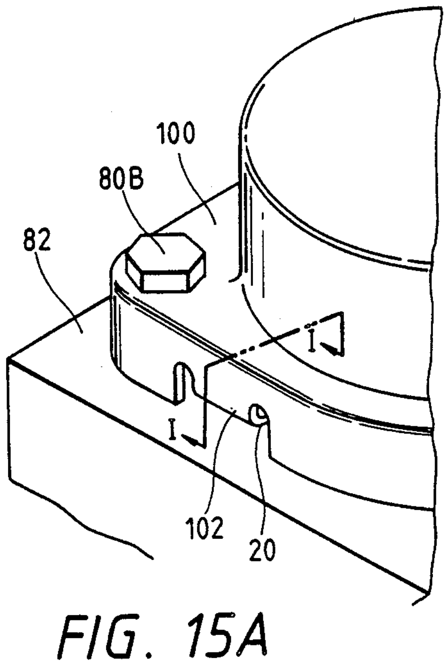
FIGS. 13A and 13B are partially enlarged views for describing the assembly thereof.
Figure 13B:
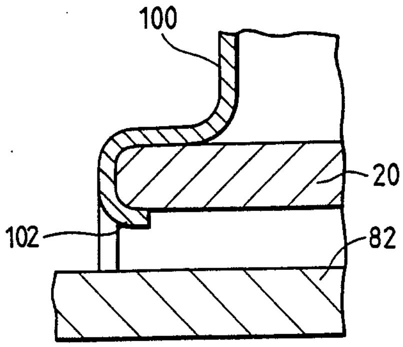

FIG. 12 is a perspective view of a yoke 100 of a 3-position rotational actuator according to another embodiment. In an open portion of the yoke 100 four engaging claws 102, 104, 106, 108 are located which result from formations of equally spaced notches **102*a*, 102*b*, 104*a*, 104*b*, 106*a*, 106*b*, 108*a*, 108*b*. The other parts of the 3-position rotational actuator with such a yoke 100 such as rotor and stator are the same as in the above-described embodiment. Thus, the fitting of yoke 100 with a base member 20 is similarly performed by the deformation of the open portion of the yoke 100. In this embodiment, the engaging claws 102 to 108 are bent inside after the coupling of the base member 20 to the yoke 100 so as to firmly secure the base member 20 to the yoke 100. FIG. 13 is an enlarged view showing one engaging claw portion in the state where the yoke 100 is joined with the base member 20 and attached to a bracket 82 of a drive body, FIG. 13A being an enlarged perspective view and FIG. 13B being a cross-sectional view taken along line I—I shown in FIG. 13A. As shown in the Figures, the base member 20 is held by an engaging claw of the yoke 100 so that the base is integrated with the yoke 100 independent of the tightening force of a bolt 80B so base 20 is not direct brought into contact with the bracket 82. This allows protection of the base member 20** from an external mechanical force and does not require a guard member such a collar as used in conventional models, resulting in simplification of the apparatus and a decrease in cost.

Although in the above-mentioned embodiment arrangements, slits, notches or the like for holding the base member are formed in the yoke, it is obvious that a similar effect can be obtained using an arrangement made to allow the integration of the base member to the yoke and to permit contact between the yoke and bracket when the 3-position rotational actuator is attached to the driven body. Therefore, an arrangement is also appropriate where the integration of both the yoke and base member is effected, for example, with engaging holes formed in the yoke being engaged with projections made on the base member or with a general industrial fastener and a mechanical force is applied to the yoke portion when the 3-position rotational actuator is attached to the driven body.

Figure 14:
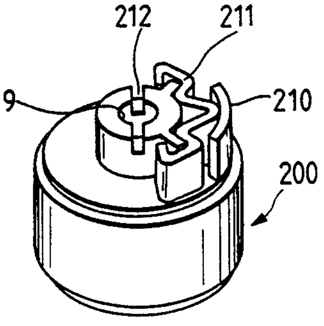
FIG. 14 is a perspective view showing a rotor in a still further embodiment.

FIG. 14 is a perspective view showing a rotor 200 of a 3-position rotational actuator according to a further embodiment.

On a bottom surface of a resin-made bobbin 8 is integrally formed a slit portion 212 and a first stopper portion 210 for limiting the rotational angle of the rotor 200.

The first stopper portion 210 is provided in order to limit the rotation of the rotor 200 to a predetermined angle range and has a substantial sectorial configuration. In addition, the first stopper portion 210 is notched and a high elastic wave-shaped leaf spring 211 is fitted. When the rotor 200 is fitted in a rotor loosely-fitting portion 22 of the base member 20 as described above to be rotated, the first stopper portion 210 and leaf spring 211 thus arranged operate with a second stopper portion 24 formed on the rotor loosely-fitting portion 22 so as to limit the rotational angle of rotor 200. Leaf spring 211 is made of a general material such as phosphorus bronze and stainless steel. Furthermore, as well as in the above-mentioned embodiment, on the base member 20 is formed a rotor loosely-fitting portion 22 which has a diameter slightly greater than the outer diameter of the rotor 200, the rotor 200 being loosely fitted therein. On this rotor loosely-fitting portion 22 is formed. The second stopper portion 24 for holding a contact member 25, comprises hard rubber which comes into contact with the leaf spring 211 fitted in the first stopper portion 210. The other arrangements are the same as in the embodiment shown in FIGS. 1 and 2 and therefore the description thereof will be omitted.

A description will be given hereinbelow in terms of operations of the first stopper portion 210, leaf spring 211, second stopper portion 24 and contact member 25 made when the rotor 200 is rotationally driven by appropriately exciting the cores 42 to 48 of the 3-position rotational actuator.

Figure 15A:
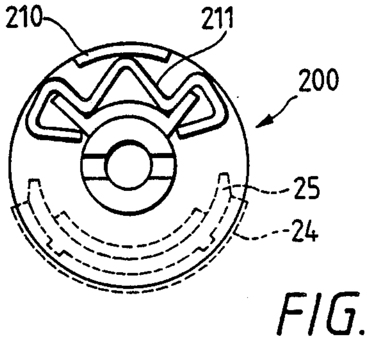
FIGS. 15A and 15B are illustrations for describing the rotating state of the rotor of the embodiment.
Figure 15B:
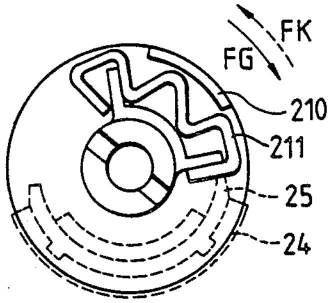

FIGS. 15A and 15B are illustrations of the rotor 200 loosely fitted in the rotor loosely-fitting portion 22, viewed from the base member 20 side, where the contact member 25 and second stopper portion 24 formed in the rotor loosely-fitting portion 22 are indicated by dotted lines.

FIG. 15A shows the state that the rotor 200 is driven to be stopped at the middle position among three stable points by exciting the cores 42 and 46. At this time, the first stopper portion 210 and leaf spring 211 of the rotor 200 are substantially at a middle position without coming into contact with the contact member 25 in the rotor loosely-fitting portion 22.

When the cores 44, 48, instead of the cores 42 and 46, are excited (positive direction in this case) in order to control the rotor 200 from this stable state to the other stable position, the relationship between the rotor 200 and the rotor loosely-fitting portion 22 is as shown in FIG. 15B. The rotor 200 is rotated by a magnetic force FG in a solid-line arrow direction so that the first stopper portion 210 and the second stopper portion 24 are brought into contact with each other. The rotor is stopped when the load FK (dotted-line arrow) from the second stopper portion 24 is balanced with the rotational force FG and results in being stable in the illustrated state.

FIG. 15 expresses such a drive of the rotor 200 from the viewpoint of the equilibrium of the two forces FG and FK, and shows the relationship between the rotational angle $\theta$ of the rotor 200 and the force applied to the rotor 200 during a period from the time of contact of the contact member 25 with the leaf spring 211 of the rotor 200 to the time of stopping of the rotation of the rotor 200. In the Figure, dotted lines indicate loads generated by the leaf spring 211 and the contact member 25 with respect to the rotational angle $\theta$. As illustrated, both show right-increasing characteristics in which the generated loads are gradually increased in accordance with an increase in the rotational angle $\theta$. On the other hand, the elastic force of the spring 211 is greater as compared with that of the contact member 25 and the load generated at the same rotational angle $\theta$ becomes smaller.

Figure 16:
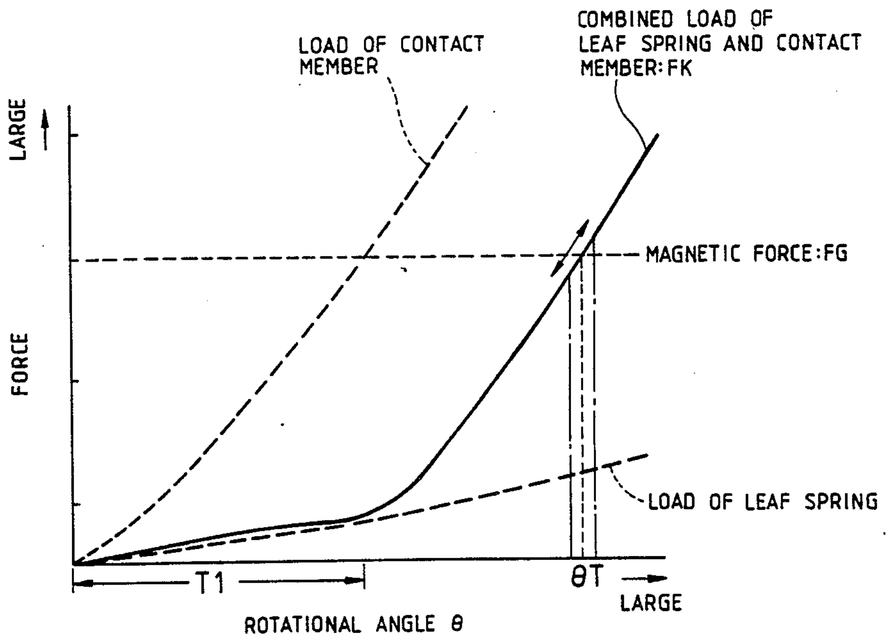
FIG. 16 is a diagram showing a force applied to the rotor for describing the the rotational principal.

The rotor 200, as shown in FIG. 16, rotates in response to the magnetic force FG due to the cores 44 and 48. When the rotational angle $\theta$ is increased by the force FG, the elastic leaf spring 211 is first bent by the pressing of the contact member 25 so as to generate the load FK against the magnetic force FG with respect to the rotor 200. The time period T1 of the generation of the load FK due to the leaf spring 211 is increased slowly in accordance with the increase in the rotational angle $\theta$ because the elastic force of the lead spring 211 is great and, when the leaf spring 211 is bent to be brought into contact with the stopper portion 210 as shown in FIG. 15B, the contact member 25 made of a hard rubber starts bending. The elastic force of the contact member 25 is small and therefore the load to be generated is rapidly increased in accordance with the increase in the rotational angle $\theta$. That is, although the increase in the rotational angle $\theta$ is slight, the load generated by the contact member 25 is rapidly increased to cause the rotor 2 to stop at the position (rotational angle $\theta$T) equivalent to the magnetic force FG.

The above-mentioned relation between the first stopper portion 210 and the second stopper portion 24 is similar even in the case that the cores 44 and 48 are excited in the opposite direction so as to rotate the rotor 200 counterclockwise.

It is obvious that the 3-position rotational actuator thus arranged and operated provides the following effects.

When operated to the three stable positions, the operating noises of the 3-position rotational acutator are extremely small and the impact noises can be reduced. That is, when the rotor 200 is operated to take the center position among the three stable positions, there is no collision between the parts and no cause of noise. When the rotor 200 is operated to take the other two stable positions, the collision between both the stopper portions occurs as shown in FIG. 15B. However, at the initial stage of the collision, the elastic leaf spring 211 acts as cushion member to reduce the rotational force. Therefore, the impact noises due to the collision are reduced and the impact between the parts is decreased so as to result in an improvement of the durability.

Furthermore, the positional accuracy of the 3-position rotational actuator of this embodiment is maintained at a high level irrespective of the presence of the leaf spring 211. When controlled to the stable position as shown in FIG. 15A, the 3-position rotational actuator is not subjected to occurrance of any collision and the positional accuracy is determined to be high as well as the normal stepping motor. In addition, even in the case that the stable position of the rotor 200 is determined by the collision between both the stopper portions (FIG. 15), as described using FIG. 15, the rotor 200 is made stable at the position equivalent in force and the positional accuracy becomes extremely high. In addition to this, the positional accuracy is made stable against the variation of the magnetic force FG.

Although in FIG. 16 the description is made for simplicity where the magnetic force FG for the rotor 200 is constant, actually the magnitude of FG is varied in accordance with the rotational angle $\theta$ and the variation with time of the permanent magnet 4 and the exciting circuit of the cores 42 to 48 which make up the rotor 200. If this relationship is shown by FIG. 16, the magnetic force FG is varied in the range indicated by an arrow in the Figure. However, as is obvious from the Figure, the load FK against the magnetic force FG occurs due to a slight variation of the rotational angle $\theta$ and therefore the positional accuracy of the rotor 200 is not decreased by providing the leaf spring 211, but depends upon only the elastic force of the contact member 25, the appropriate adjustment thereof resulting in being designed to have a desired accuracy.

Although in the above-mentioned embodiment the leaf spring 211 is attached to the first stopper portion 210 formed on the rotor 200, without being limited to such an arrangement, it is also appropriate that the leaf spring is attached to the second stopper portion 24 of the base member 20 side.

Figure 17A:
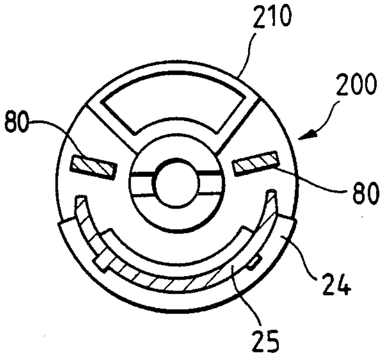
FIG. 17A and 17B are illustrations for describing arrangements of a rotation limiting portion of a rotor in a further embodiment.

Furthermore, as is obvious from the description using FIG. 16, it is necessary that in order to determine the rotational angle of the rotor 200 with high accuracy the elastic force of the contact member 25 for finally stopping the rotation of the rotor 200 is small and the leaf spring 211 for absorbing the impact on the collision between both the stopper portions is large. However the arrangement of the elastic force is not limited to satisfying this condition. For example, as shown in FIG. 17A, it is appropriate to movably provide an elastic rubber piece 80 between the first stopper portion 210 of the rotor 200 and the second stopper portion 24 of the base member 20. With such an arrangement, the rubber piece 80 is moved between the first stopper portion 210 and the second stopper portion 24 so as to absorb the impact occuring between both the stopper portions.

Figure 17B:
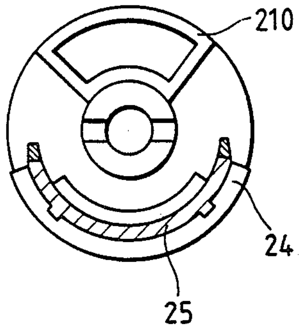

In addition, it is also appropriate that, as shown in FIG. 17B, the contact member 25 for holding the second stopper portion 25 is constructed as a unitary member in which only one end portion thereof coming into contact with the first stopper portion 210 has a high elastic characteristic. Using such a unitary member results in decrease in the number of parts and is advantageous in assisting quality control and lowering manufacturing cost.

What is claimed is:

1. A 3-position rotational actuator comprising:

a yoke;

a stator covered by said yoke and having two pairs of field poles each of which are in spaced and opposed relation to each other, the opposed field poles being excited with opposite polarities;

a rotor made up of a magnet and arranged to be rotatable to take three positions which are a first stable point due to a field produced by one pair of field poles of said stator, a second stable point due to the positive magnetic pole produced by the other pair of field poles of said stator spaced from said first stable point, and a third stable point due to the opposite field;

a base member fixedly secured to said yoke and enclosing said stator and said rotor together with said yoke; and a rotation limiting member provided on said base member for compulsorily retarding the rotation of said rotor on the way from said first stable point to said second stable point and from said first stable point to said third stable point, wherein the magnetic flux to said rotor from the other pair of field poles of said stator for rotating said rotor from said first stable point is substantially equal in magnitude to the magnetic flux to said rotor from the one pair of field poles of said stator for maintaining said rotor at said first stable point, and the magnetic flux density of the other pair of field poles of said stator applied to said rotor is smaller that that of the one pair of field poles of said stator.

2. A 3-position rotational actuator as claimed in claim 1, wherein a stator angle θA of the other pair of field poles which are in opposed relation to said rotor is greater than a stator angle θB of the one pair of field poles of said stator which are in opposed relation to said rotor.

3. A 3-position rotational actuator as claimed in claim 2, wherein said stator angle θA is set to be in a range of $65° < \theta A < 80°$ and said stator angle θB is set to be in a range of $80° < \theta B < 106°$ in correspondance with said stator angle θA.

4. A 3-position rotational actuator as claimed in claim 1, wherein said rotation limiting member is resin-formed integrally with said base member.

5. A 3-position rotational actuator as claimed in claim 1, wherein said yoke is made of a soft iron material and having a plurality of claws which are bent so that said base member is fixedly secured to said yoke.

6. A 3-position rotational actuator as claimed in claim 5, wherein said yoke has at a fixing portion to a driven body a protruding portion which is formed to be projected from said base member to said driven body side, said protruding portion being fixedly brought into contact with said driven body so that said base member is held by said claw portion without coming into contact with said driven body.

7. A 3-position rotational actuator as claimed in claim 6, wherein a cushion member is provided between said base member and said driven body.

8. A 3-position rotational actuator as claimed in claim 1, wherein said rotation limiting member comprises a first limiting member formed on said rotor, a cushion member made of a material having a higher elastic force as compared with said first limiting member and integrated with said first limiting member when said rotor is rotated up to the vicinity of a stopping position before said second or third stable point, and a second limiting member made of a material with a lower elastic force as compared with said cushion member and provided on said stator and coming into contact with said cushion member so as to limit the rotation of said rotor when said rotor is rotated up to a stopping position before said second or third stable point.

* * * * *